US012779547B1

(12) United States Patent
Georgiou

(10) Patent No.: US 12,779,547 B1
(45) Date of Patent: Nov. 3, 2026

(54) CUTTING TOOL

(71) Applicant: George Georgiou, Tecumseh (CA)

(72) Inventor: George Georgiou, Tecumseh (CA)

( * ) Notice: Subject to any disclaimer, the term of this patent is extended or adjusted under 35 U.S.C. 154(b) by 562 days.

(21) Appl. No.: 17/586,915

(22) Filed: Jan. 28, 2022

Related U.S. Application Data

(60) Provisional application No. 63/147,583, filed on Feb. 9, 2021.

(51) Int. Cl.
*B23B 27/10* (2006.01)
*B23B 51/06* (2006.01)
*B23C 5/28* (2006.01)

(52) U.S. Cl.
CPC .............. *B23B 27/10* (2013.01); *B23B 51/06* (2013.01); *B23C 5/28* (2013.01); *B23B 2260/072* (2013.01)

(58) Field of Classification Search
CPC ........ B23C 5/28; B23C 2250/12; B23B 51/06
See application file for complete search history.

(56) References Cited

U.S. PATENT DOCUMENTS

2010/0150673 A1* 6/2010 Schneider ................. B21F 7/00 408/230
2013/0115017 A1* 5/2013 Schanz ................ B23D 77/006 408/229
2015/0328696 A1* 11/2015 Wang ...................... B23B 51/06 408/57
2016/0214187 A1* 7/2016 Fukata ...................... B23C 5/28
2019/0143423 A1* 5/2019 Nakata ...................... B23C 5/28 408/226
2022/0080516 A1* 3/2022 Ogawa ...................... B23C 5/10

* cited by examiner

*Primary Examiner* — Sunil K Singh
*Assistant Examiner* — Eric Daniel Whitmire
(74) *Attorney, Agent, or Firm* — Burgess Law Office, PLLC

(57) ABSTRACT

A cutting tool having internal cooling channels and apertures that direct a coolant medium, MWF, Cryogen or air-based coolants, to an accessible surface of the tool, including a flank face. The cutting tool directs the coolant medium to accessible surfaces of the tool while in operation, including the flank face. Directing the spray from the flank face breaks down the insulating layer and provides forced flow cooling for higher heat dissipation and increased tool speed capability. A method of making a cutting tool wherein axial helical channels and intersecting plunge grind notches produce apertures that form a fan spray pattern to overlap and cool the full length of the flank face of each flute.

17 Claims, 8 Drawing Sheets

Finish Cutter

Figure #1- Prior Art
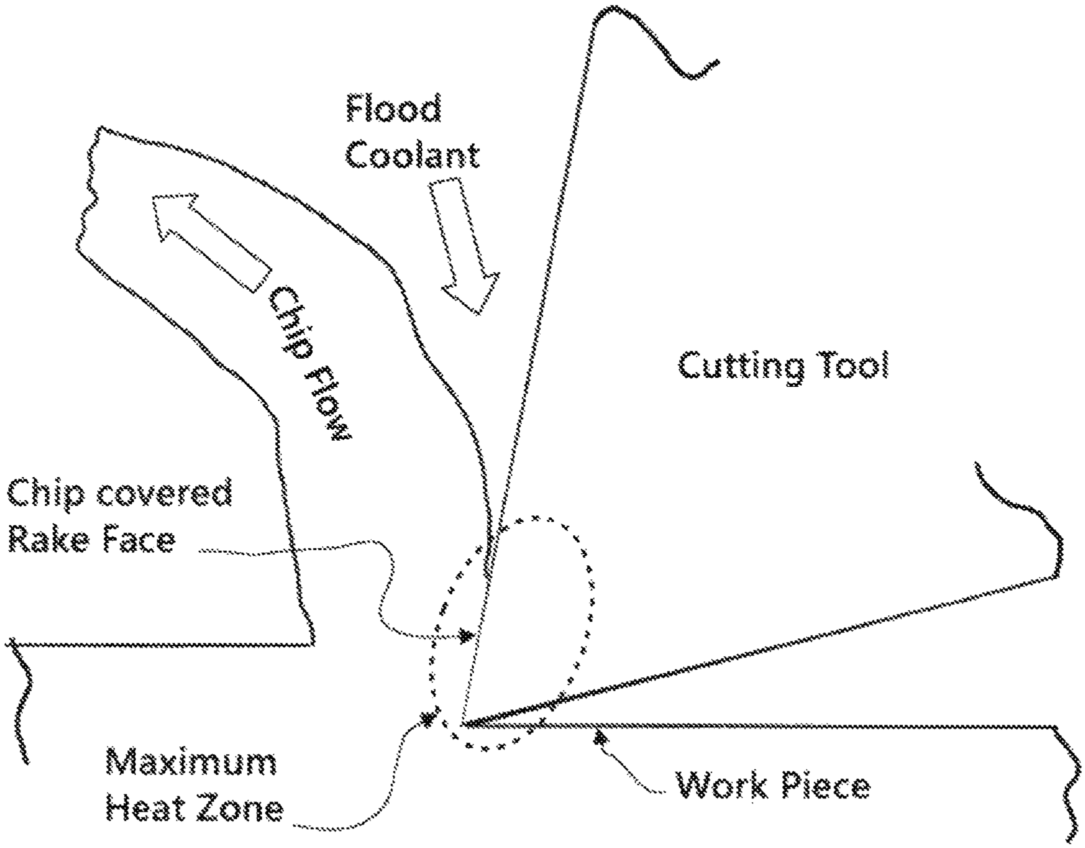

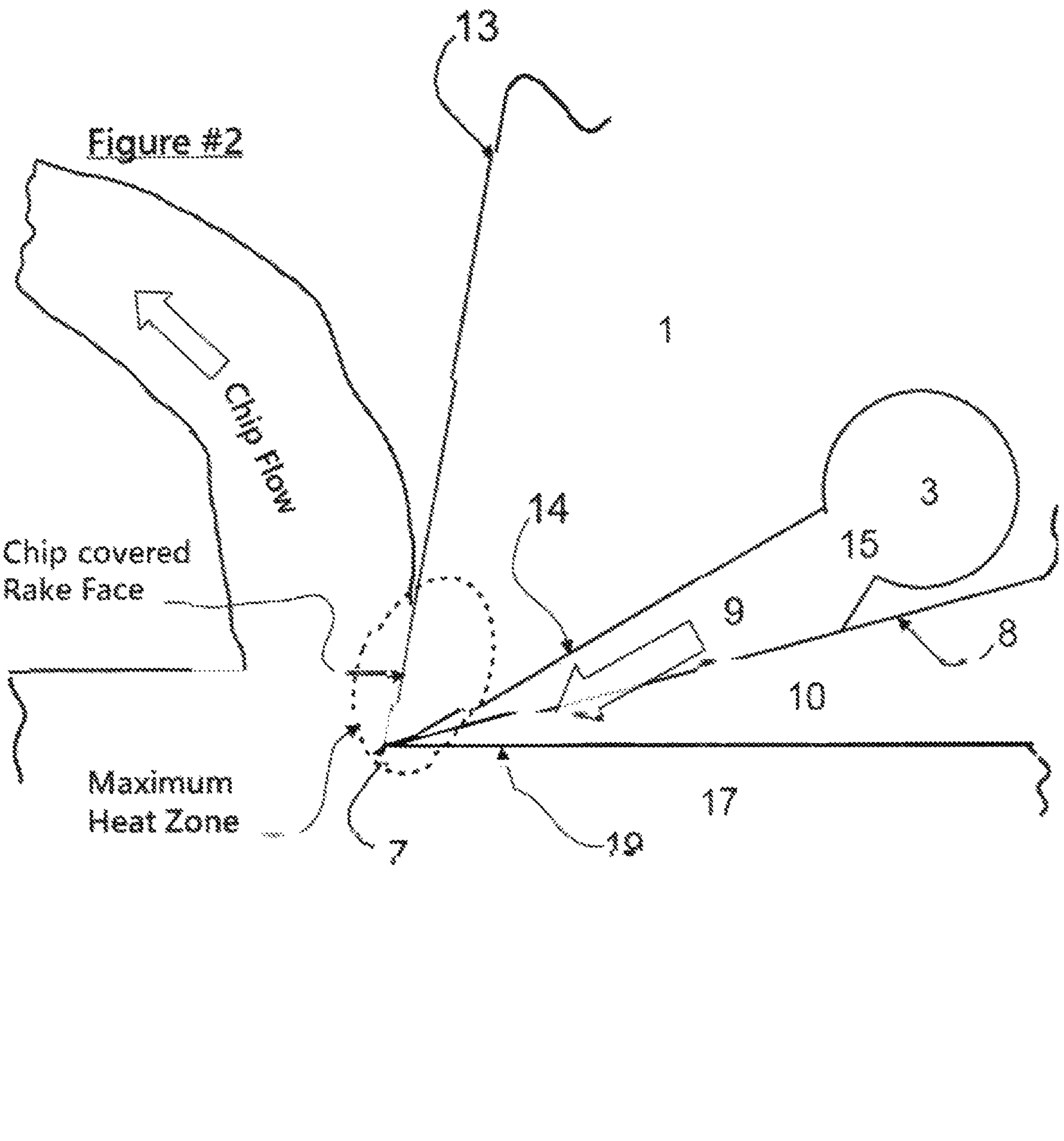
13
Figure #2
1
Chip Flow
3
14
15
9
8
Chip covered
Rake Face
10
Maximum
Heat Zone
17
7
19

Figure #3
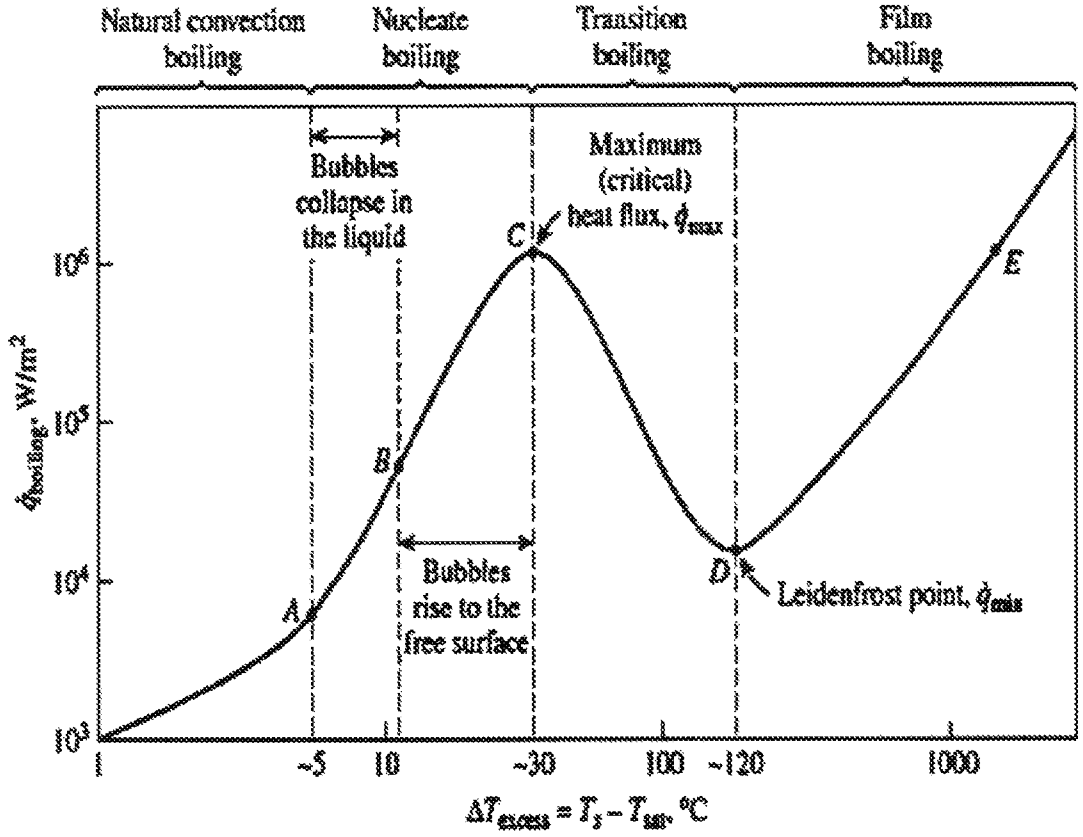

Figure #4
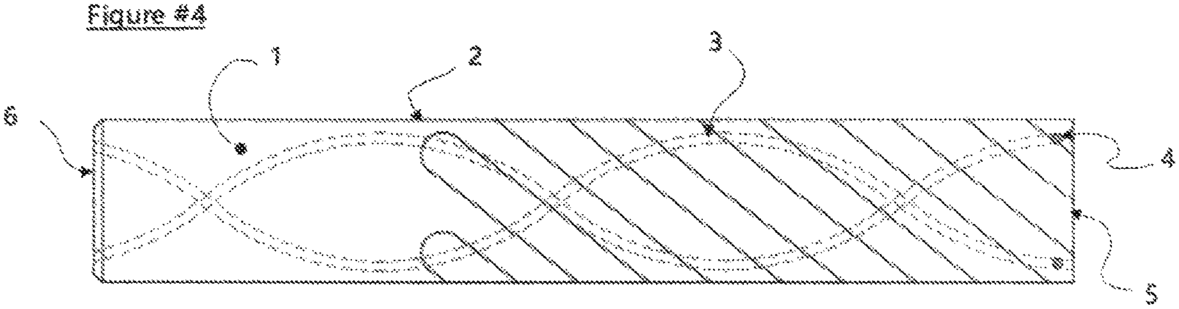
Figure #5A
Figure #5B
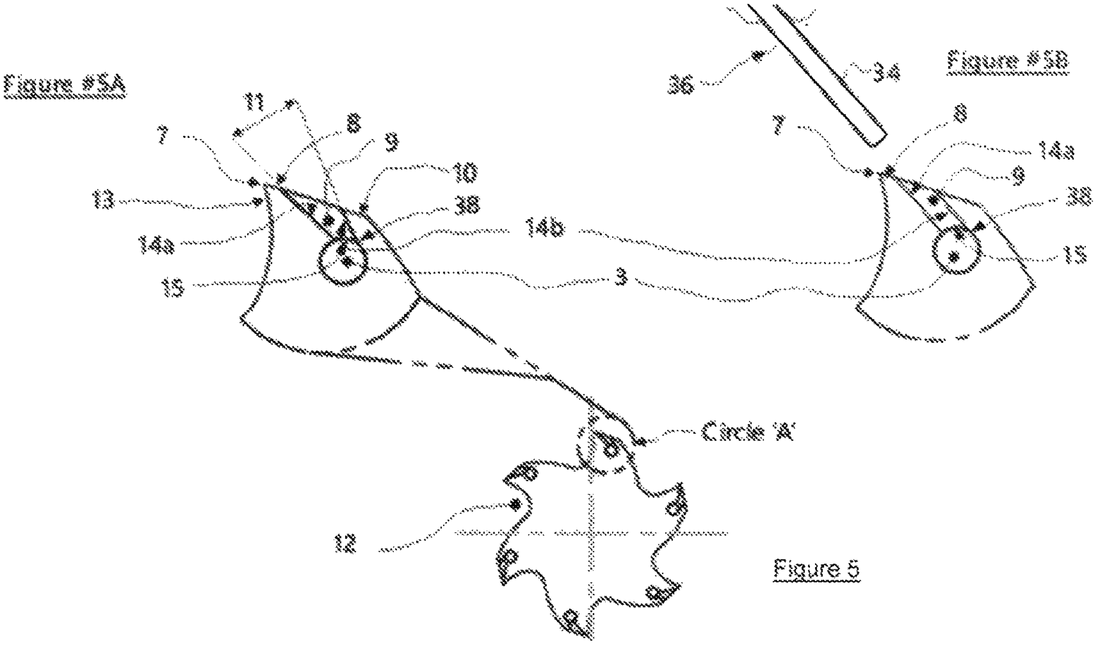
Figure 5

Figure #6
Figure #6A
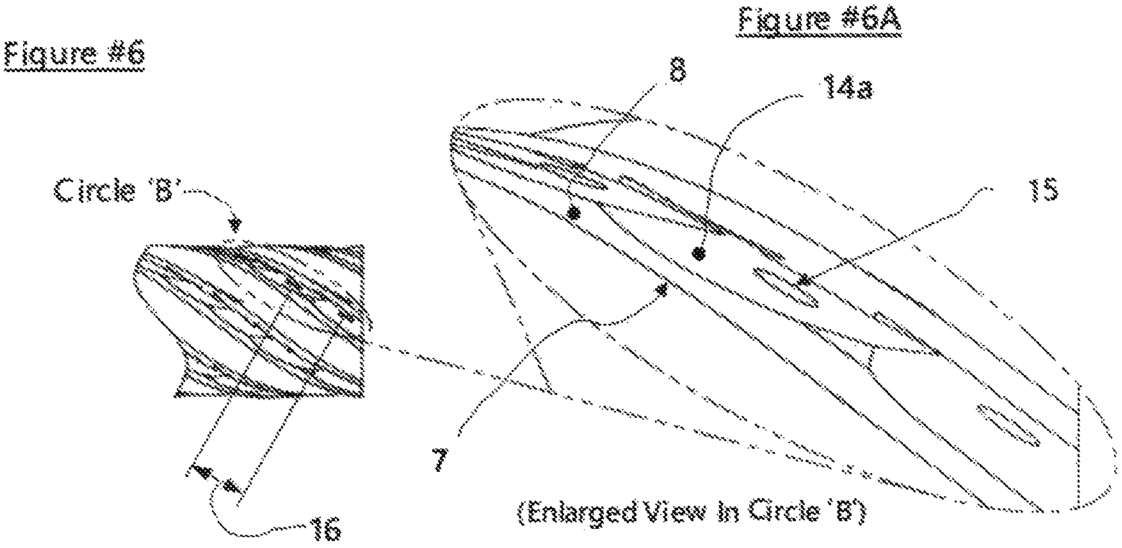
(Enlarged View In Circle 'B')

Extrusion
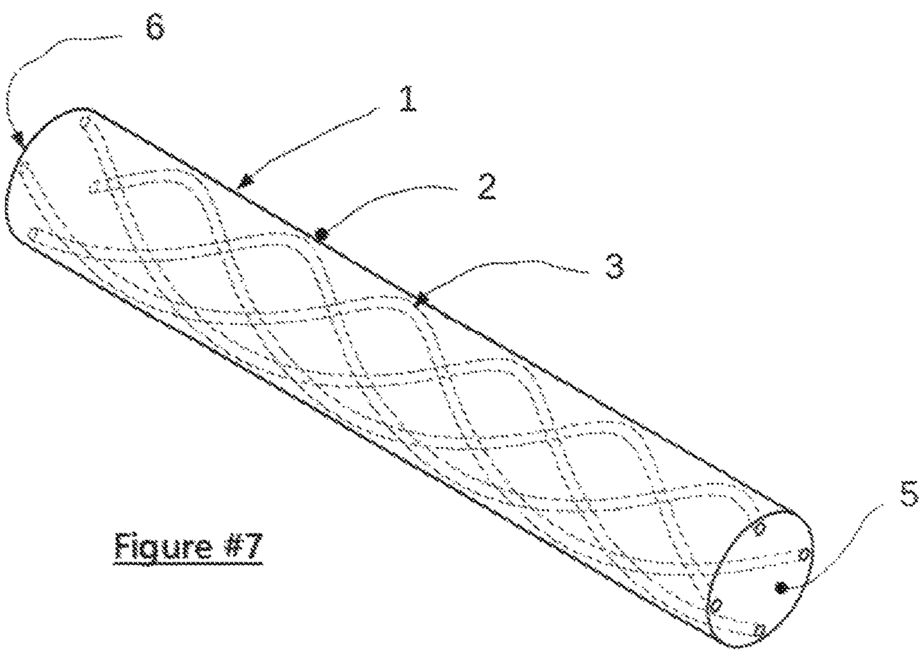
Figure #7
Flute Grind & End plugs after final sintering (full hardness)
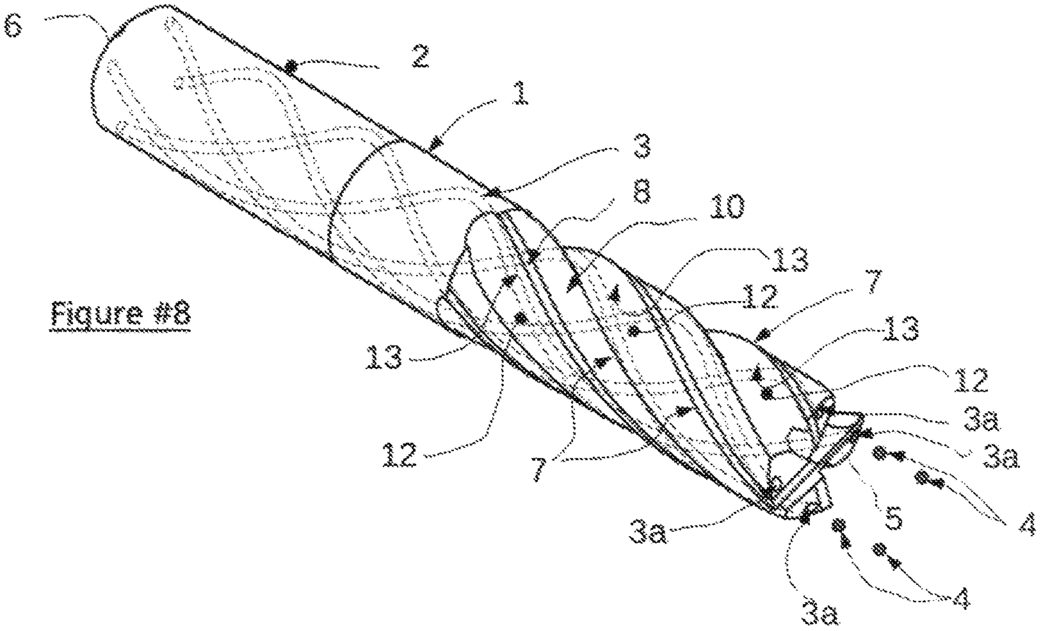
Figure #8

Notch and Aperture Grind (3 Views)
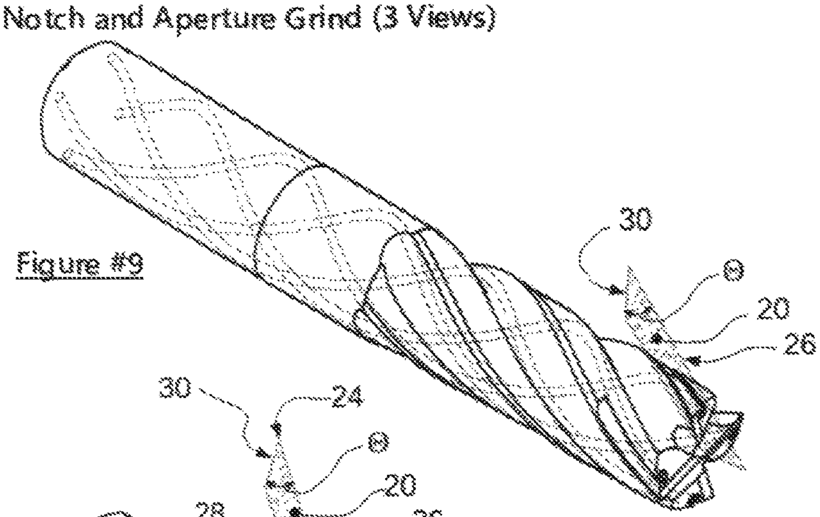
Figure #9
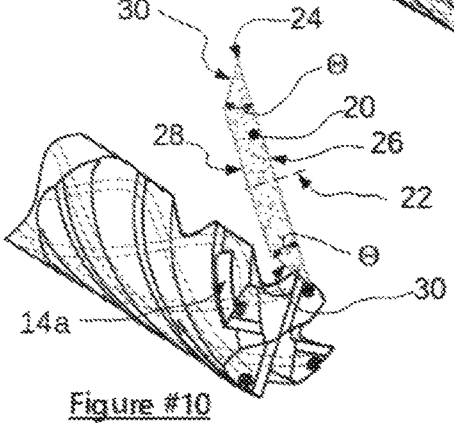
Figure #10
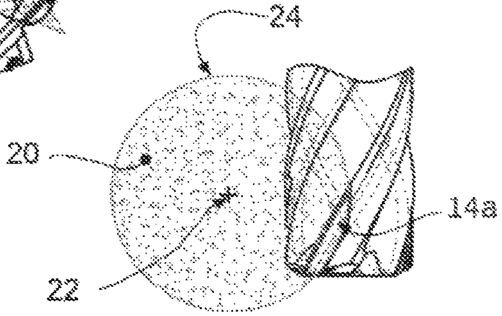
Figure #11
Finish Cutter
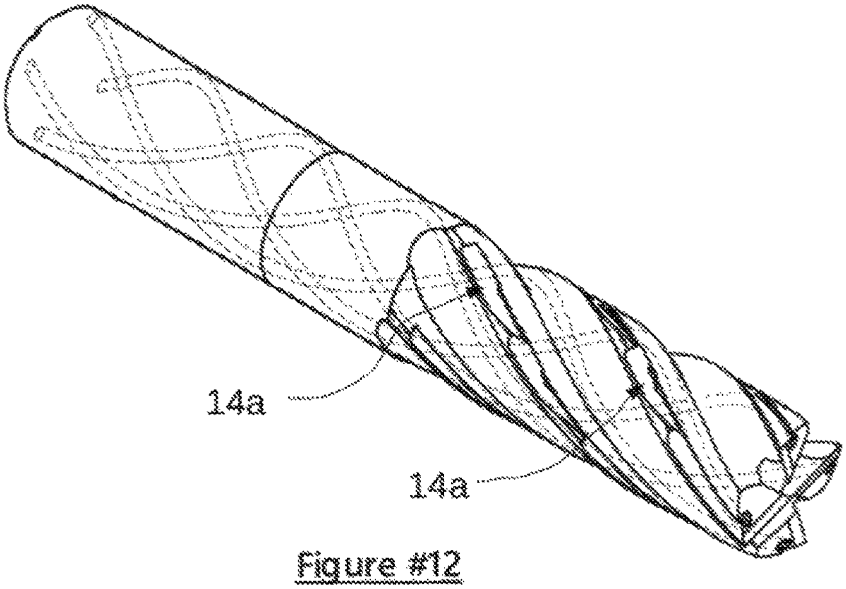
Figure #12

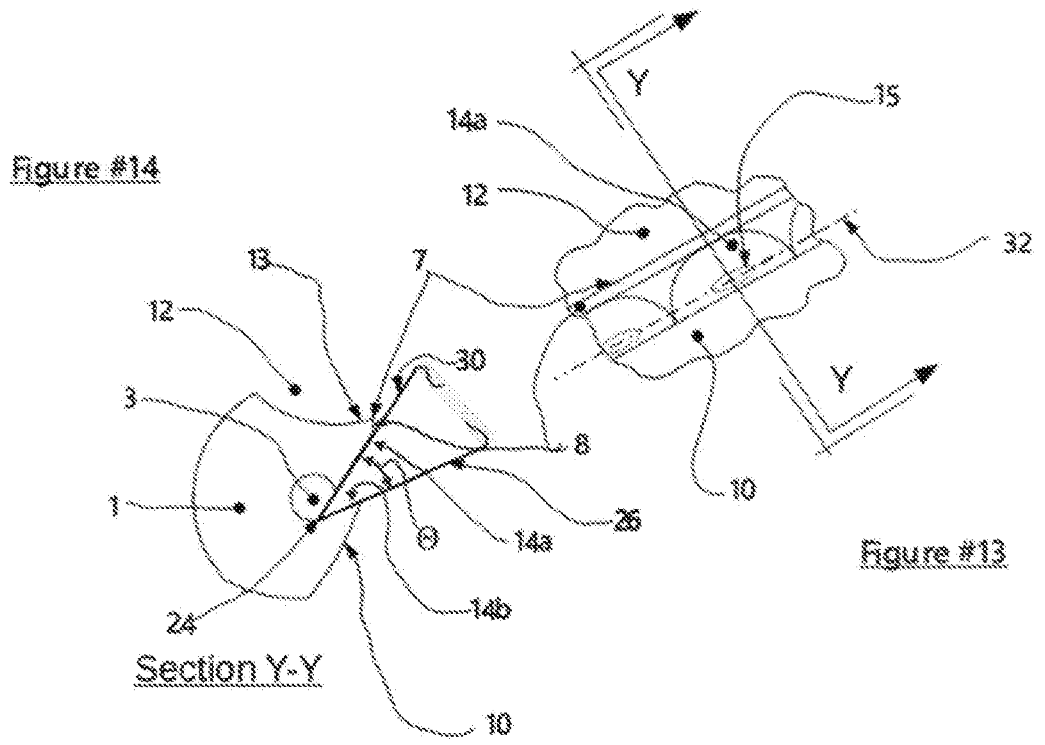
Figure #14
13
7
12
30
3
8
1
26
Θ
14a
24
14b
Section Y-Y
10
Y
15
14a
12
32
Y
10
Figure #13

CUTTING TOOL

CROSS-REFERENCE TO RELATED APPLICATIONS

This application claims the benefit of U.S. Provisional Application No. 63/147,583, filed Feb. 9, 2021. The disclosure of the above application is incorporated herein by reference.

BACKGROUND OF THE INVENTION

1. Field of the Invention

The present invention generally relates to cutting tools and, more particularly, to a cutting tool having cooling channels, a coolant aperture configured for flank-forced-cooling placed at the flank, and a method of making the cutting tool.

2. Description of Related Art

FIG. 1 shows a schematic view of a prior art milling operation using a conventional cutting tool and cooling process. During a milling operation's cutting process, the cutting tool's front or rake face is not normally an accessible cooling surface because the rake face is covered with the constantly forming chip that slides up the rake face during the cut. As illustrated in FIG. 1, the chip flow blocks coolant flowing along the rake face from reaching the cutting edge. FIG. 1 shows the maximum heat zone in the area of the cutting edge.

The metal machining industry acknowledges cutting-heat is the most critical factor, dictating the upper limit of the metal removal rate (MRR). Increasing the metal removal rate results in less machining time/cost per unit of work/production part. Many advances in the machining art are directly or indirectly related to reducing and managing cutting-heat. Cutting tool material developments were designed to maintain cutting edge hardness at elevated speeds. Historical difficulty and limitations of cutting-heat extraction have led to tool material and process improvements to maintain cutting edge hardness at elevated temperatures, include pressurized coolant spray strategies, improved lubrication from tool coatings, and lubrication additives in metalworking fluids. For example, there is a known progression from carbon steel to tool steels, from high-speed steels to carbides, to polycrystalline diamonds (PCD), to cubic boron nitride (CBN), and tool-coating developments. Additional means to reduce or manage cutting-heat include metalworking fluid (MWF) formulations, pressurized, forced-cooling methods, and cryogenic machining heat management systems.

SUMMARY OF THE INVENTION

A cutting tool including a tool body having an internal coolant channel. The coolant channel intersected by an indentation or notch forming an aperture in the coolant channel to direct pressurized coolant flow. The apertures are formed in a flank face of the tool body. The apertures create a coolant fan shaped coolant spray pattern.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic side view of prior art machining process using conventional cooling.

FIG. 2 is a schematic side view of a machining process using a cutting tool according to the principles of the present disclosure.

FIG. 3 is a diagram of a fluid going through heat absorption.

FIG. 4 is a side view with hidden lines showing the helically extruded coolant channels in a cutting tool according to one example of the present disclosure.

FIG. 5 is a schematic cross-sectional view of a cutting tool according to one example of the present disclosure.

FIG. 5A is an enlarged view of the cutting tool of FIG. 5 in Circle 'A'.

FIG. 5B is an enlarged view of the cutting tool of FIG. 5 in Circle 'A' showing an alternative example of the present disclosure.

FIG. 6 is a partial side view of a cutting tool according to one example of the present disclosure.

FIG. 6A is an enlarged view of the cutting tool taken in circle 'B' of FIG. 6 showing the apertures created with the flank face notch grinding.

FIG. 7 is a perspective view of a cutting tool blank extrusion according to one example of the present disclosure.

FIG. 8 is a perspective view of a cutting tool having flutes ground and end plugs for insertion after final sintering according to one example of the present disclosure.

FIG. 9 is a perspective view of a cutting tool and a grinding wheel, the grinding wheel for forming a notch and aperture in the cutting tool according to one example of the present disclosure.

FIG. 10 is an enlarged perspective view of a portion of the cutting tool and the grinding wheel for forming a notch and aperture in the cutting tool according to one example of the present disclosure.

FIG. 11 is an enlarged plan view of the cutting tool and the grinding wheel for forming a notch and aperture in the cutting tool according to one example of the present disclosure FIG. 12 is a perspective view of a cutting tool according to one example of the present disclosure.

FIG. 13 is a schematic partial plan illustrating the notch and aperture in a cutting tool according to one example of the present disclosure.

FIG. 14 is a cross-sectional view of the cutting tool of FIG. 13 taken on line Y-Y, showing a schematic view showing a grinding wheel in the cutting tool.

DETAILED DESCRIPTION OF THE PREFERRED EMBODIMENTS

The following description of the preferred embodiment(s) is merely exemplary in nature and is in no way intended to limit the invention, its application, or uses.

In the different figures, equivalent parts are provided with the same reference numerals or symbols, wherein they are generally only described once.

FIG. 2 schematically illustrates one example or embodiment of a cutting tool 1 according to an aspect of the present disclosure. As shown, the cutting tool 1 includes a rake face 13 and a flank face 8. The flank face 8 is the area immediately behind the cutting edge 7 and provides back edge clearance 18. The flank face 8 can be a flat angle or an arcuate surface. The flank face 8 may also include a secondary relief or back edge clearance surface 10, see FIG. 8, which also provides back edge clearance 18. The cutting tool 1 includes a coolant channel 3 and an aperture 15 extending through the flank face 8 to the coolant channel 3. The aperture 15 allowing a flow of pressurized coolant from the coolant channel 3, through the aperture 15, to an area adjacent the cutting edge 7. The coolant flow path 17 directs coolant to an accessible surface; the flank face 8 of the tool while in operation.

The flank face or surface is difficult to cool with cooling media because it rotates away from the cooling media. Conventional flood cooling strategies or methods fail to effectively cool this quickly rotating-away surface area. Passive coolant flow or external pressurized flood coolant methods do not accelerate coolant to continually contact the rotating-away face or surface and extract the cutting heat. As illustrated in FIG. 2, the flank face 8, because of back edge clearance 18-space between the flank face 8 and machined surface of a workpiece material 19, by functional cutter design, is always accessible. The drawings illustrate an example of the cutting tool 1 having internal coolant channels 3 with exit apertures 15 that rotate with the cutting tool 1. The cutting tool 1, according to the present disclosure, uses lower coolant pressure to continually spray the coolant from and through the aperture 15 onto the flank face 8 of the tool because additional coolant pressure energy needed to accelerate the coolant to the rotational speed of the cutting tool 1 is not required. Coolant refers to all forms of metalworking fluid (MWF) formulations, pressurized, forced-cooling methods, and cryogenic machining heat management systems using LN2, Co2 or Super Critical Co2 mix of lubrication enhanced cryogen cooling strategies. This cutter cooling system is most efficient when using cryogenic coolants then MWF's, and lastly air based coolants like dry air of MQL, Minimum Quantity Lubrication.

The cutting tool 1 also resolves and overcomes a second, non-obvious heat extraction problem. Positioning the coolant channel 3, aperture 15, and coolant flow path 17 as shown in FIG. 2 helps overcome the insulating gas layer behind the cutting edge. During a cutting or milling operation, as a cutter rotates at cutting speed, the back, or back edge clearance 18 of each cutting flute, creates a low-pressure area. Any coolant reaching this area will quickly move from 'Transition Boiling' to 'Film Boiling.' Using a boiling pot of water analogy, 'Transition Boiling' occurs as a pot of water is brought to a boil. FIG. 3 is a diagram illustrating the steps in liquid heat-transfer boiling. Initially, the heat transfer to the liquid causes small gas bubbles to form on the bottom of the pot. As the bubbles gain size, with more heat evaporation, they rise off the bottom. As the liquid absorbs more heat, the gas bubbles continue to accelerate in number and size until a heat point is reached where 'Transition Boiling' begins to reduce the liquid's heat transfer capability.

As the temperature increases and reaches the 'Leidenfrost' point, 'Film Boiling' starts. 'Film Boiling' is where an accumulation of vapor bubbles join due to the violence of the boil to create an insulating vapor layer between the heated metal surface of the pot and the liquid coolant. The heat transfer at this point is less effective than the initial nucleate boiling, where small bubbles have just started to release off the pot metal surface. In this range, around the 'Leidenfrost' point, the heat build-up in the metal pot or tool increases due to the poor liquid heat transfer.

Introducing a pressurized coolant flow can disturb (wash away) the insulating gas layer. Using a force-flow cooling on the flank face 8 of the cutting tool 1—the bottom of the pot-restores the heat transfer capability from the metal surfaces. The force-flow cooling enables higher input-heat to develop on a heated surface before causing softening or melting damage to the pot-cutting tool.

Similarly, as a cutting tool edge temperature moves past the coolant's critical boiling point, the heat transfer capability is limited due to this insulating gas layer. The gas layer formation and Leidenfrost condition is much more significant with cryogenic fluids like LN2 where boiling starts at −321° F. compared to water based MWF which boil at +212° F.

As shown in FIG. 1, with conventional cutting tools, the rake face, the front rotational face of the tool, has the rotational energy during operation to help displace the insulating gas layer in a flood coolant application. Still, the effect is minimized due to the chip blocking coolant access to the heated rake face. The back edge clearance, the area between the flank face and the machined surface of the workplace material, has a low-pressure area due to the forward rotation of the cutter, similar to a vane or impeller pump cavitation effect, where passive, flood coolant may or may not make any intermittent contact with the heated flank face surface. A conventional, externally applied pressurized coolant spray will also have difficulty contacting the heated flank face again due to the physics of the cutter rotation.

FIG. 2 illustrates an example of the cutting tool 1 having a flank face 8 with apertures 15. Pressurized coolant from within the rotating cutting tool 1 sprays from the apertures 15. The apertures 15 provide an outlet for pressurized coolant spray on the flank face 8, with the coolant flow's velocity being additive to the cutter rotation. By providing coolant contact or coolant flow on the flank face 8, the 'forced flow cooling' displaces any resulting insulating gas layer of 'Film Boiling' at the flank face 8, enabling functionality at higher cutting temperatures, which equates to faster cutting speeds.

FIG. 2 further illustrates the coolant exit aperture 15 and corresponding pressurized coolant flow path 17, formed in the flank face 8 by a manufacturing method including grinding an indentation or notch 9 creating a corresponding aperture 15 in the flank face 8.

As illustrated in FIG. 4, the cutting tool 1 starts with a helically extruded carbide blank. The extruded passages or coolant channels 3 are near the outside diameter 2 of the finished cutter diameter of the cutting tool 1. The blanks can be sintered as fully hardened blanks stocked on carbide tool fabricator's inventory shelves, ready to be finished ground to a final product as the demand arises. These can also be manufactured as Pre-forms. Pre-forms are where a pressed or extruded carbide blank is pre-sintered in a furnace to a semi-hard, machinable state allowing detailed machining to be done inexpensively before being in a fully furnace hardened state. In the Pre-form option, the rough flute grinding can be processed before fully hardening (sintering) the blanks.

The flutes 12 of the cutting tool 1 are located based on the radial orientation of the extruded coolant channels 3. Flute 12 location places the coolant channels 3 in the correct position, near the cutting edge 7 of each flute 12 of the cutting tool 1. After full hardening, and after the back edge clearance 18 is ground on the cutting tool 1, a small diameter notch grinding wheel is used to intermittently indent or notch 9 the flank face 8 and expose the helical coolant channel 3 to the outside surface or flank face 8 of each flute 12. Configuring the notch shape as shown in FIGS. 6 and 6A places the aperture 15 close to the back of the cutting edge 7, but not so close as to compromise the strength of the cutting edge 7. In one example, the minimum distance between the aperture 15 and the cutting edge 7 is selected by experience to withstand expected cutting loads. Another example includes a cross-sectional area calculation analysis of the 'transverse rupture strength' of the carbide to withstand the cutting loads with a safety margin; e.g., a 0.10 mm flank land is too small, but 0.30 mm will work for a finishing cutter cutting Grade 5 Titanium. However, a 0.50 mm flank land may be required for a roughing cutter application.

The aperture spacing 16 along the flute's 12 cutting edge 7 results in a spray pattern emanating from each aperture 15 that effectively overlaps adjacent spray patterns from adjacent aperture 15 to cover the complete flank face 8 length; i.e., the apertures 15 are spaced longitudinally in the direction of the helical axis 32 of the flute 12.

The front end 5 of the cutting tool 1 requires plugs 4 in the helical coolant channels 3 plugging of the helical coolant channels exits in the front end 5 of the cutting tool 1 to create pressurized flow through the apertures 15 in the flank face 8. A variety of plug methods can be used; e.g., an interference fit of small soft metallic balls or short cylindrical rods placed in coolant channels 3 at the front and 5 of the cutting tool 1. In addition, a high-temperature epoxy, for example, an alumina adhesive may be used with the metallic balls or short cylindrical rods. In addition, the plug methods may include under-size metallic balls epoxied in place with a high-temperature adhesive. A further plugging method is available when the Pre-form process described above is used. The method includes inserting small diameter Pre-form rods into the ends of the coolant channels 3. The Pre-form rods will fuse the outer walls of the rods to the inner diameter of the coolant channels 3 during the final hardening (HIP) furnace sintering process.

FIGS. 4-6 illustrate one example of the cutting tool 1 and method of making the same. As shown, the cutting tool 1 includes tool body. The tool body is built to the lower diameter size limits of carbide extrusion technology, which is in the few millimeters range and with no upper diameter limits other than cost efficiency around 30 mm to 50 mm. The cutting tool 1 includes helical extruded coolant channels 3 in the tool body. The helical extruded coolant channels 3 coincide with the number of flutes 12 designed based on cutter application and can range from one to the maximum allowable, limited only by physical space—the helix of the cutting edges 7/flutes 12 match the helix of the coolant channels 3. Variable helix or unequal cutting edge 7/flute 12 spacing can be accommodated by the extrusion die design. These extrusions with outside diameter grind stock can be fully hardened in conventional carbide (HIP) furnaces at standard industry blank lengths (normally 300 mm).

Another method of making the cutting tool body includes a Pre-form method used to produce the helical coolant channels. The method includes producing a Pre-form core by machining the Pre-form core equal in diameter to the circumscribed tangent of the coolant channel holes 3. The core is grooved on the designed helical at the same spacing as the extruded concept already discussed. This grooved core is then inserted into a pre-formed bushing. The inside diameter of the bushing becomes the seal for the open slot channels of the core. In the (HIP) sinter furnace the outside diameter of the grooved core and the inside diameter of the bushing will fuse together to produce a near 'D' shaped channel. Control of the mating diameters is very critical for a proper fused seal.

The method includes selecting a specific tool size and cutting an appropriate diameter blank the selected cutter length—the distance between the front end face 5 and back end face 6. The blank outside diameter 2 is ground using the extruded holes pattern to determine concentric orientation.

FIG. 5 shows the flutes 12, which can be ground using the outer diameter 2 of the cutting tool 1 for the concentric axis datum and using the radial orientation of coolant channel 3 as the radial datum. The distance of the coolant channels 3 to the outside diameter 2 of the tool is configured to be as near the outer surface, for example, the flank face 8, without breaking through, taking into account accumulating manufacturing tolerances. The distance of the coolant channel 3 to the cutting edge 7 is also configured to minimize the depth of the indentation or notch 9. Forming the indentation or notch 9 includes forming the sidewalls 14*a*, 14*b* and creating the aperture 15, as shown in FIG. 6, by exposing a portion of the coolant channel 3.

As shown in FIG. 5, grinding the rake face 13 forms or creates the flute 12. The intersection of the flute 12, defined by the rake face 13 and the flank face 8, creates the cutting edge 7. The back edge clearance surface 10 is ground to provide relief to minimize friction behind the cutting edge 7. The back edge clearance surface 10 extends at a relief angle to maintain cutting edge 7 strength. The relief angle can be formed as a convex cam relief, which blends a slow drop of the flank face 8 to an increasing drop at the back edge clearance surface 10. Another method is a land or shallow primary flank face 8 followed by a secondary back edge relief 10.

FIG. 6 shows the shape of the aperture formed with a notch plunge grind, illustrated in FIGS. 9-11 and 13, using a wheel grinder. One example of the present disclosure includes using a cup wheel 20. Plunging the cup wheel grinder 20 into the flank face 8 forms a notch 9 in the cutting tool 1. The notch 9 includes sidewalls 14*a*, 14*b* tipped or oriented parallel to the cutting tool 1 helix. The depth of the plunge grind is calculated to break into and expose a portion of the coolant channel 3, creating an aperture 15 and forming a coolant flow path 17 from the coolant channel 3 through the aperture 15 to a point adjacent or near the cutting edge 7. The notch plunge grind includes using a notching or grinding wheel, in one example, a cup wheel 20 with a shallow included angle between 30 to 50 degrees included. The cup wheel 20 creates an angular profile 11, shown in FIG. 5, with a corresponding included angle, the angle between the sidewalls 14*a* and 14*b*. The included angle 11 is limited by the strength of the cup wheel 20. In one example, a lesser angle, an angle closer to 30 degrees, is preferred wherein the sidewalls 14*a*, 14*b* focus or direct the spray pattern. In a further example, as the outer diameter 2 of the cutting tool 1 decreases, the size of the included angle 11 should also decrease to improve the focus of the spray pattern.

Using the cup wheel 20 is one example of a method for creating the indentation or notch 9 and creating the aperture 15 by exposing a portion of the cooling channel 3. While a lesser angle 11 is preferred, for example, less than 30 degrees, as the angle $\theta$ of the cup wheel 20 decreases, the strength and life of the cup wheel 20 also decrease. A shallow angle cup wheel 20, for example, one having an angle $\theta$ of 10 degrees or less, may improve the spray pattern but may be cost-prohibitive due to lower wheel strength, which may cause premature wear and size reduction.

FIG. 5*b* shows an additional embodiment of a method for forming the notch or indentation using a flat disk or slitting/grinding wheel 34 having a circular shape rotating about an axis 36. The flat disk or slitting/grinding wheel forms an indentation or notch 9 having parallel sidewalls 14*a*, 14*b*. In addition, a notch having a parallel wall configuration may be manufactured by EDM (Electrical Discharge Machine) or LASER drill method. The parallel sidewall 14*a*, 14*b* configuration may improve the spray pattern, but may be cost-prohibitive due to lower wheel strength, which may cause premature wear and size reduction and may also be cost-prohibitive due to the cost of the disc shaped electrodes and the rapid wear of the disks.

The indentation or notch 9 creates an aperture 15 exposing a portion of the coolant channel 3. The aperture 15 and notch 9 cooperating to provide a low turbulence transition of coolant flow from the coolant channels 3 to the flank face 8 of the tool. In one example, the distal slot wall 14*b* should be tangent 38 to the coolant channel 3 to minimize flow turbulence. Distal slot wall 14*a* should be positioned, spaced from the cutting edge 7, to meet the flank minimum width 8. As disclosed, when the cup wheel 20 forms the indentation or notch 9, the walls 14*a*, 14*b* separate or extend at the angle θ of the cup wheel 20. When a slitting saw, flat disc wheel, or EDM of LASER slotting process forms the indentation or notch 9, the walls 14*a*, 14*b* are parallel.

On method for forming the indentation or notch 9 includes determining the needed minimum width of the flank face 8, the distance between the intersection of the proximal sidewall 14*a* and the flank face 8, and the cutting edge 7. Determining the width of aperture 15, wherein the width, the distance between the proximal and distal sidewalls 14*a*, 14*b* adjacent or next to the coolant channel 3 is less than the diameter of the coolant channel 3. Wherein the proximal sidewall 14*a* of the notch 9 extends from the minimum width position of the flank face 8 and the opposing or distal sidewall 14*b* is tangent to the coolant channel 3.

The spacing 16 between the apertures 15 is configured to minimize the number of notch plunge grinds required per flute 12; however, the primary requirement is to provide overlapping spray to the full flank face 8 along the length of the cutting tool 1. For example, overlapping the coolant spray from adjacent apertures provides a forced flow cooling effect to cool and correspondingly protect the cutting edge 7.

The open ends of the helical coolant channels 3 at the front end face 5 are plugged using a plug 4 by having an interference fit. In another example, a soft metal ball, rod, or an undersized ball/rod are be epoxied in the coolant channel 3 using high temperature or ceramic-based adhesives. Whatever plug 4 or plug mechanism is used, it should withstand the maximum cutting heat, mechanical vibration, and rotational forces occurring during a cutting or milling operation. The methods discussed above can manage these concerns. The plug 4 should also be set at a depth from the front end face 5 to accommodate cutter tool regrinds, but limited to a maximum distance to where the last apertures 15 spray pattern contact the flank face 8 adjacent to the front end face 5.

FIGS. 7-12 illustrate exemplary steps and processes occurring during the manufacturing of the cutting tool. As illustrated in FIG. 7, the body of the cutting tool 1 is extruded with a plurality of coolant channels 3. The extrusion has a cylindrical shape having an outer surface establishing a tool or blank diameter 2. The coolant channels 3 extend longitudinally, in a helical pattern, between a front face 5 and a rear face 6.

FIG. 8 illustrates a further configuration of a cutting tool 1 showing the flutes 12 formed by a helical, longitudinally extending rake face 13 on the cutting tool 1. The rake face 13 cooperating with a flank face 8 forms a cutting edge 7. FIG. further illustrates the plugs 4 used to plug the apertures 3*a* formed at the end or front face 5 by the coolant channels 3.

FIGS. 9-11 illustrate different views of the cutting tool 1 showing a cup grinding wheel 20. As illustrated, the cup grinding wheel 20 engages the flank face 8, removes a portion of the flank face 8, and exposes a portion of the coolant channel 3, forming the aperture 15. FIG. 6A shows the cup grinding wheel 20 forming an indentation or notch 9 in the flank face 8. As shown, the indentation or notch 9 may extend into the back edge clearance surface 10.

FIGS. 9-11 shows a cup grinding wheel 20 having a circular shape rotating about an axis 22. The cup grinding wheel 20 has an arcuate outer edge 24. The cup grinding wheel 20 has a generally trapezoidal cross-section with a top surface 26, a lower surface 28, and a side surface 30. As shown in FIG. 10, the top surface 26 and side surface 30 meet at an angle θ. The cup grinding wheel 20 plunges-extends into the flank face 8 to form the indentation or notch 9. The notch 9 has opposing first and second sidewalls 14*a*, 14*b*. The first sidewall 14*a* is referred to for clarity as the proximal sidewall because it is closer in proximity to the cutting edge 7. The second sidewall 14*b* is referred to as the distal sidewall as it is further from the cutting edge 7.

FIG. 13 shows the arcuate cutting edge 24 of the cup grinding wheel 20 extending into the coolant channel 3. The side surface 30 of the cup grinding wheel 20 forms the proximal sidewall 14*a*, and the top surface 26 of the cup grinding wheel 20 forms the distal sidewall 14*b*. FIG. 5A shows the first and second sidewalls 14*a*, 14*b*, converging at an included angle 11, the included angle corresponding to the angle θ illustrated in FIG. 10.

FIG. 14 shows a nozzle formed by the indentation notch 9 wherein the pressurized coolant from the coolant channel 3 travels in the direction of the arrows outwardly and is directed by the proximal and distal sidewalls 14*a*, 14*b* in a flow pattern toward the cutting edge 7. The aperture's 15 oblong or elliptical shape and size controls the flow spray pattern in the longitudinal axis direction. The oblong or elliptical shape of the aperture 15 results in a fan shape coolant pattern, wherein the shape and size of the aperture 15 is configured to create an overlapping fan-spray pattern at the predetermined distance 16 between the apertures 15.

Because the cup grinding wheel 20 is circular and plunges or travels inward toward the longitudinal axis of the cutting tool 1 in a perpendicular direction, and the coolant channel 3 and flank face 8 extend helically, the flat side surface 30 grinds downward and removes the material of the flank face 8 to expose a longitudinally extending portion of the coolant channel 3. FIG. 6A shows the flat side surface 30 grinds inward toward the crest of the helical coolant channel 3. As it grinds away the material adjacent to the crest and into the helical coolant channel 3, it creates an oblong or elliptical aperture 15. The size or configuration of the oblong or elliptical aperture 15 is determined by the depth/plunge of the cup grinding wheel 20.

The cup grinding wheel 20 forms an indentation or notch 9 in the flank face of the cutting tool 1. The indentation or notch 9 exposes a portion of the coolant channel 3 to form the aperture 15. Correspondingly, the aperture 15 forms a spray nozzle that controls the coolant spray or distribution from the cooling channels 3 to the cutting edge 7. The configuration of the cup grinding wheel 20, for example, the outer diameter and angle between the top surface 26 and side surface 30, may be varied to vary the opening size of the aperture 15 and the angle and length of the respective proximal and distal sidewalls 14*a*, 14*b*. In addition, the diameter and plunge depth of the cup grinding wheel 20 is considered in determining the major and minor axis measurements of the aperture 15.

The size or diameter and helical spiral of the cooling channels 3 are considered along with the spacing of the coolant channels from the outer diameter 2 of the cutting tool 1 in determining the nozzle's configuration-configuration of the aperture 15 formed by the indentation or notch 9.

One example of a cutting tool 1 according to the present invention has the following dimensions: 0.472 inch diameter, 1.417 inch cut length, 10 degree positive rake angle, 12 degree primary flank relief, 17 degree secondary relief, and having 4 cutting flutes. The example includes a cup grinding wheel having the following dimensions: 5.00 inch diameter, 35 degree included angle, 0.004 inch corner radius, and a plunge depth of 0.070 inch. Using the foregoing results in a cutting tool having an aperture 15 having an elliptical or oblong configuration with a major axis of 0.060 inches and a minor axis of 0.010 inches. The included angle formed by the proximal sidewall 14*a* and distal sidewall 14*b* is 35° with a distance of 0.010 inches from the cutting edge 7 to the indentation or notch 9 formed by the intersection of proximal sidewall 14*a* and the flank face 8.

Varying the configuration of the aperture 15 and the proximal and distal sidewalls 14*a* and 14*b* varies the spray pattern of the nozzle created by the notch 9.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cutting tool comprising:

a tool body having a longitudinal axis, a plurality of helical longitudinally extending flutes, and a plurality of helical longitudinally extending lands between the flutes;

each helical longitudinally extending flute including a helical longitudinally rake face cooperating with a helical longitudinally extending flank face of an adjacent helical longitudinally extending land to form a helical, longitudinally extending cutting edge;

the flank face having a helical longitudinally extending back edge clearance surface, the back edge clearance surface cooperating with an adjacent helical longitudinally extending flute;

the tool body, including a helical longitudinally extending coolant channel spaced from the helical longitudinally extending cutting edge;

a plurality of notches formed in the helical longitudinally extending land, each notch communicating with the helical longitudinally extending coolant channel; and each notch extends parallel to the helical longitudinally extending cutting edge.

2. The cutting tool of claim 1 including:

each notch includes a planar sidewall extending transverse parallel to the helical longitudinally extending coolant channel.

3. The cutting tool of claim 1 wherein:

each of the notches form an oblong-shaped aperture in the helical longitudinally extending coolant channel, the oblong-shaped aperture having a long side extending in parallel to the direction of the helical longitudinally extending coolant channel.

4. The cutting tool of claim 1 including:

each notch having at least two sidewalls; and each of the sidewalls extends parallel to the helical longitudinally extending cutting edge.

5. The cutting tool of claim 4 wherein:

at least one of the sidewalls extends radially outward from and touches the helical longitudinally extending coolant channel.

6. The cutting tool of claim 4 wherein:

the sidewalls are oriented to one another at an acute included angle.

7. The cutting tool of claim 6 wherein:

the angle is 30 degrees.

8. The cutting tool of claim 4 wherein:

the sidewalls extend radially outward from the helical longitudinally extending coolant channel and are parallel to each other.

9. The cutting tool of claim 4 including:

at least a portion of each sidewall intersects with the helical longitudinally extending coolant channel wherein the space between the sidewalls at the intersection with the helical longitudinally extending coolant channel is less than a diameter of the helical longitudinally extending coolant channel.

10. The cutting tool of claim 1 including:

each notch forming an aperture in the helical longitudinally extending coolant channel; and each aperture in the helical longitudinally extending coolant channel having a width in a direction perpendicular to the helical longitudinally extending coolant channel that is less than a diameter of the coolant channel; and each aperture in the helical longitudinally extending coolant channel having a length in a direction parallel to the helical longitudinally extending coolant channel that is greater than the diameter of the coolant channel.

11. The cutting tool of claim 1 including:

each notch having at least two sidewalls;

each of the sidewalls extends transverse to the helical longitudinally extending coolant channel; and at least one of the sidewalls extends radially outward from and is tangent to the helical longitudinally extending coolant channel, and the other sidewall intersects the helical longitudinally extending coolant channel.

12. A cutting tool comprising:

a tool body having a longitudinal axis, a plurality of helical longitudinally extending flutes, and a plurality of helical longitudinally extending lands between the flutes;

each helical longitudinally extending flute including helical longitudinally extending a rake face cooperating with a helical longitudinally extending flank face of an adjacent helical longitudinally extending land to form a helical, longitudinally extending cutting edge;

the flank face having a helical longitudinally extending back edge clearance surface, the back edge clearance surface cooperating with an adjacent helical longitudinally extending flute;

the tool body, including a helical longitudinally extending coolant channel spaced from the cutting edge; and a plurality of apertures formed in the helical longitudinally extending flank face, the apertures extending inwardly from the flank face to the coolant channel, each aperture includes a sidewall, the sidewall extends from the coolant channel to the longitudinally extending flank face and extends adjacent to the helical longitudinally extending cutting edge with the sidewall parallel to the helical longitudinally extending cutting edge.

13. The cutting tool of claim 12 including:

the apertures located between the rake face of the flute and the back edge clearance surface.

14. The cutting tool of claim 12 including:

the aperture having an elliptical shape at an intersection of the aperture and coolant channel.

15. The cutting tool of claim 14 including:

the aperture includes a proximal sidewall extending from the flank face to the coolant channel and a distal sidewall extending from the flank face to the coolant channel, the proximal sidewall spaced from the distal sidewall; and the aperture having a width at the intersection of the aperture and coolant channel wherein the distance between the proximal sidewall and the distal sidewall adjacent the coolant channel is less than a diameter of the coolant channel.

16. The cutting tool of claim 14 including:

the aperture includes a proximal sidewall extending from the flank face to the coolant channel and a distal sidewall extending from the flank face to the coolant channel, the proximal sidewall spaced from the distal sidewall wherein the proximal sidewall intersects the coolant channel and the distal sidewall is tangent to the coolant channel.

17. A cutting tool comprising:

a tool body having a longitudinal axis, a plurality of helical longitudinally extending flutes, and a plurality of helical longitudinally extending lands between the flutes;

each helical longitudinally extending flute including a rake face cooperating with a helical longitudinally extending flank face of an adjacent helical longitudinally extending land to form a helical, longitudinally extending cutting edge, the flute on one side of the cutting edge and the land on the opposite side of the cutting edge;

the tool body, including a helical longitudinally extending coolant channel spaced from the cutting edge; and a plurality of elongated notches formed in the helical longitudinally extending land, the notches extending longitudinally along the tool body, each notch communicating with the helical longitudinally extending coolant channel wherein each notch extends parallel to the helical longitudinally extending cutting edge and is asymmetrically located on the helical longitudinally extending land such that one side of the notch is adjacent to the longitudinally extending cutting edge.

* * * * *